United States Patent [15] 3,704,452

Beausoleil et al. [45] Nov. 28, 1972

[54] SHIFT REGISTER STORAGE UNIT

[72] Inventors: William F. Beausoleil, Poughkeepsie; David T. Brown, Wappingers Falls, both of N.Y.; William A. Clark, Boulder, Colo.

[73] Assignee: International Business Machines Corporation, Armonk, N.Y.

[22] Filed: Dec. 31, 1970

[21] Appl. No.: 103,201

[52] U.S. Cl. .................................340/172.5, 307/238
[51] Int. Cl. ..............................G06f 9/20, H03k 5/00
[58] Field of Search ....340/172.5; 235/157; 307/221, 307/238

[56] References Cited

UNITED STATES PATENTS

| | | | |
|---|---|---|---|
| 3,478,325 | 11/1969 | Oeters et al. | 340/172.5 |
| 3,351,917 | 11/1967 | Shimabukuro | 340/172.5 |
| 3,231,868 | 1/1966 | Bloom et al. | 340/172.5 |
| 3,328,772 | 6/1967 | Oeters | 340/172.5 |
| 3,333,252 | 7/1967 | Shimabukuro | 340/172.5 |
| 3,353,162 | 11/1967 | Richard et al. | 340/172.5 |
| 3,341,819 | 9/1967 | Emerson | 340/172.5 |
| 3,533,074 | 10/1970 | Webb | 340/172.5 |
| 3,508,204 | 4/1970 | Cutaia | 340/172.5 |
| 3,471,835 | 10/1969 | Gribble et al. | 340/172.5 |

*Primary Examiner*—Paul J. Henon
*Assistant Examiner*—Mark Edward Nusbaum
*Attorney*—Edgar H. Kent

[57] ABSTRACT

A data storage unit is provided in which groups or "pages" of data including their addresses are stored in shift registers in successive positions, the registers being operable on a signal requesting access to shift their contents repetitively to the next position in one or more loops which include a position wherein a page may be accessed and in one or more loops which excludes said access position. Controls are provided for varying the shifting in said loops such that the positions of some or all of the pages of separately accessed classes are dynamically reordered so that they are presented to said access position on such signal in approximately or exactly the order in which they were last requested, thus reducing average access time in programs involving considerable repeated reference to a limited group of pages of the class.

11 Claims, 10 Drawing Figures

SHIFT REGISTER STORAGE UNIT

SUMMARY OF THE INVENTION

The invention relates to shift registers and controls for data storage, particularly such storage in memories which are addressed in response to programs as in computers. The registers are arranged in separately accessible sections, herein called "classes", each storing a desired number K of units of data bits and their associated address and other bits, said units herein called "pages". Provision is made for shifting all of the pages through the number of positions K of the class, one of which is an access position having read-out and/or write equipment for extracting the data or substituting new data. Provision is also made for address testing to cause operation of the access equipment when the page with a requested address is in the access position.

Shift register storage as so far described has certain advantages over fixed position storage such as greater simplicity and lower cost of the hardware, compactness, and lack of noise problems inherent in coincident current accessing of fixed position storage. However, since the pages are stored in a fixed succession and each requested page may be anywhere in the succession, the average access time is long, being half the number of shifts required to move the page most remote therefrom to the access position.

Requests for access to data storage are usually on an ordered rather than a random basis and it has been established that there is a high probability in an ordered system, such as a computer program, of frequent repetitive requests for access to certain pages in a given class or in congruent classes.

An object of this invention is to provide shift register storage units so organized and controlled that in operation pages thereof and accompanying addresses are reordered in position so that recent previously accessed pages may be shifted into an access position on a priority basis, thereby taking advantage of the above-mentioned probability to shorten substantially the average access time to the unit.

Another object is to provide such units in which the shift registers may be of the dynamic or static types and in which the reordering is effected dynamically within the unit and without external controls.

A further object is to provide such units which are capable in use of dynamically reordering all or some of the pages thereof for shifting to the access position in the exact order in which they were last previously accessed.

A still further object is to provide such units having aforesaid advantages in which the registers and their controls are relatively simple and inexpensive to produce.

In attaining the foregoing objects the invention utilizes a plurality of shift registers equal in number to the number of data bits to a page plus the number of address bits and any other related bits such as parity bits per page, the registers being arranged in parallel so that corresponding shift positions of the registers represent the data plus the address and other bits of a page. The number of such shift positions corresponds to the number K of pages in a class. In one embodiment, an additional shift register is provided for an indicating bit. The registers are arranged for shifting the pages in loops which selectively include or exclude the access position and controls are provided for such shifting which effect the reordering of the pages in the desired manner. The reordering controls may be applied to some or all of the pages of a class.

If it is desired to reorder all K pages of a class, two shift loops may be provided, one including all page positions and the other excluding the access position. Alternatively, a limited number of the pages may be subject to reordering control, in which case an additional shift loop is provided containing the uncontrolled pages which is coupled to the access position only if the requested page is not found in the controlled pages. The reordering may be exact or approximate, depending on the nature of the registers and controls utilized.

In one preferred embodiment of the invention shift registers are employed which are shiftable in opposite directions. When the requested page is not in the access position, all pages are shifted in one direction in a loop including the access position until the requested page reaches that position. The other pages are then shifted in the opposite direction in a loop excluding the access position until the page last in the access position is in the position for first shifting thereto on the next reversal of shift on the following request. In this embodiment, the whole class of pages can eventually become ordered in the direction of shift to the access position according to recency of access thereto, and, if an entire memory is made up of classes having such shift registers and controls, eventually the entire memory may become so ordered.

Another embodiment of the invention utilizes unidirectional shift registers organized to shift the pages successively in two groups, each of which selectively includes or excludes the access position. When the requested page is not in the access position, a specific one of the groups is always searched first for the requested page and, if that page is not found in that first searched group, then the other group is searched and coupled to the access position to supply the requested page, the first searched group being selectively coupled to the second group to exchange a page for the requested page. In this particular embodiment, the second searched group is random while the first searched group may be ordered or random, according to type of register and controls. If the first searched group is ordered, the positions of the first searched group are presented to the access position in the order of their last previous access and a page exchanged therefrom with the second group is the one longest there without access request. Therefore the positions of the first searched group are presented to the access position in the order in which they were last previously accessed. If the first searched group is not ordered, the pages thereof will be presented to the access position in random order and a page exchanged with the second group will also be random, the probabilities being, however, that the first searched group contains most of the recently accessed pages.

The foregoing and other objects, features and advantages of the invention will be more readily apparent from the ensuing description of preferred embodiments thereof.

DESCRIPTION OF PREFERRED EMBODIMENTS

The invention will first be explained with reference to the simplified diagrams of FIGS. 1, 2, 7 and 9 as this will facilitate understanding of the more detailed operating circuitry of the other Figures.

a. Explanation of Simplified Diagrams

Figure 1:
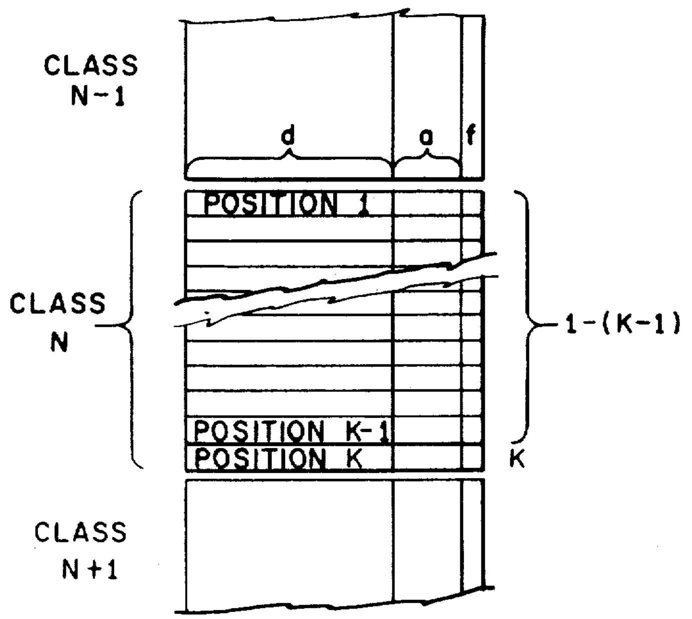
FIG. 1 is a diagrammatic layout explanatory of shift register arrangement in storage according to one embodiment of the present invention.

FIG. 1 partially illustrates in diagram three congruent classes of storage registers N, N + 1 and N − 1 each of which is equipped for separate access and for page reordering in accordance with the invention. Each class is made up of shift registers which extend and shift longitudinally of the Figure, each register having K shift positions, K being equal to the page storage capacity of the class. Each side-by-side shift position of these registers contains all the bits of a page. There are therefore a group of registers *d* equal in number to the number of data bits per page, plus a group *a* equal to the number of address bits per page. In this embodiment there is also an additional register for a flag bit. The registers are shifted in unison so that the pages are shifted successively from one position to the next. Position K is the page position equipped for address testing and read-write accessing.

Figure 2:
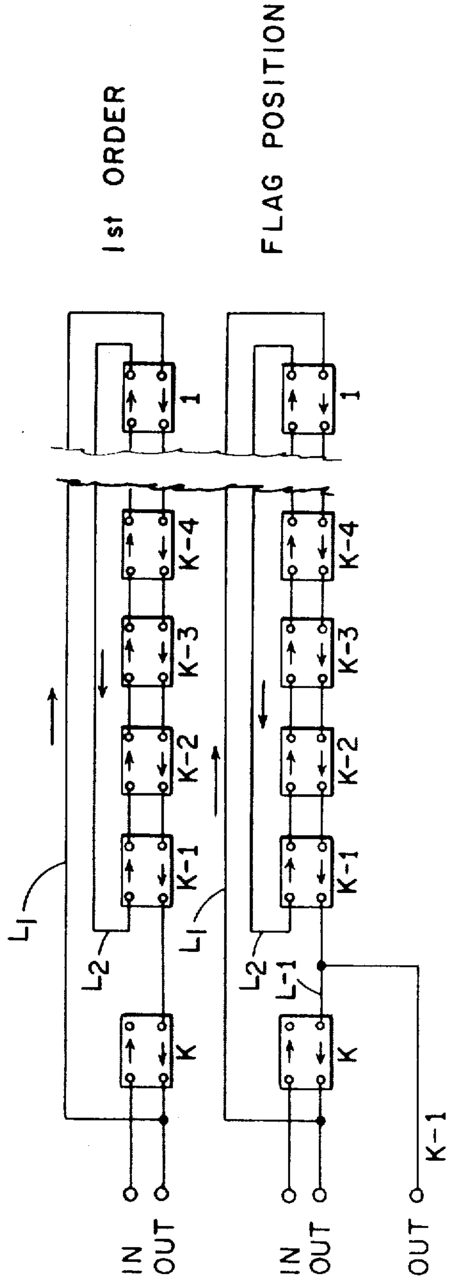
FIG. 2 shows by symbol certain positions of two of the K position shift registers of FIG. 1 and illustrates the manner of shifting and input-output connections.
Figure 3:
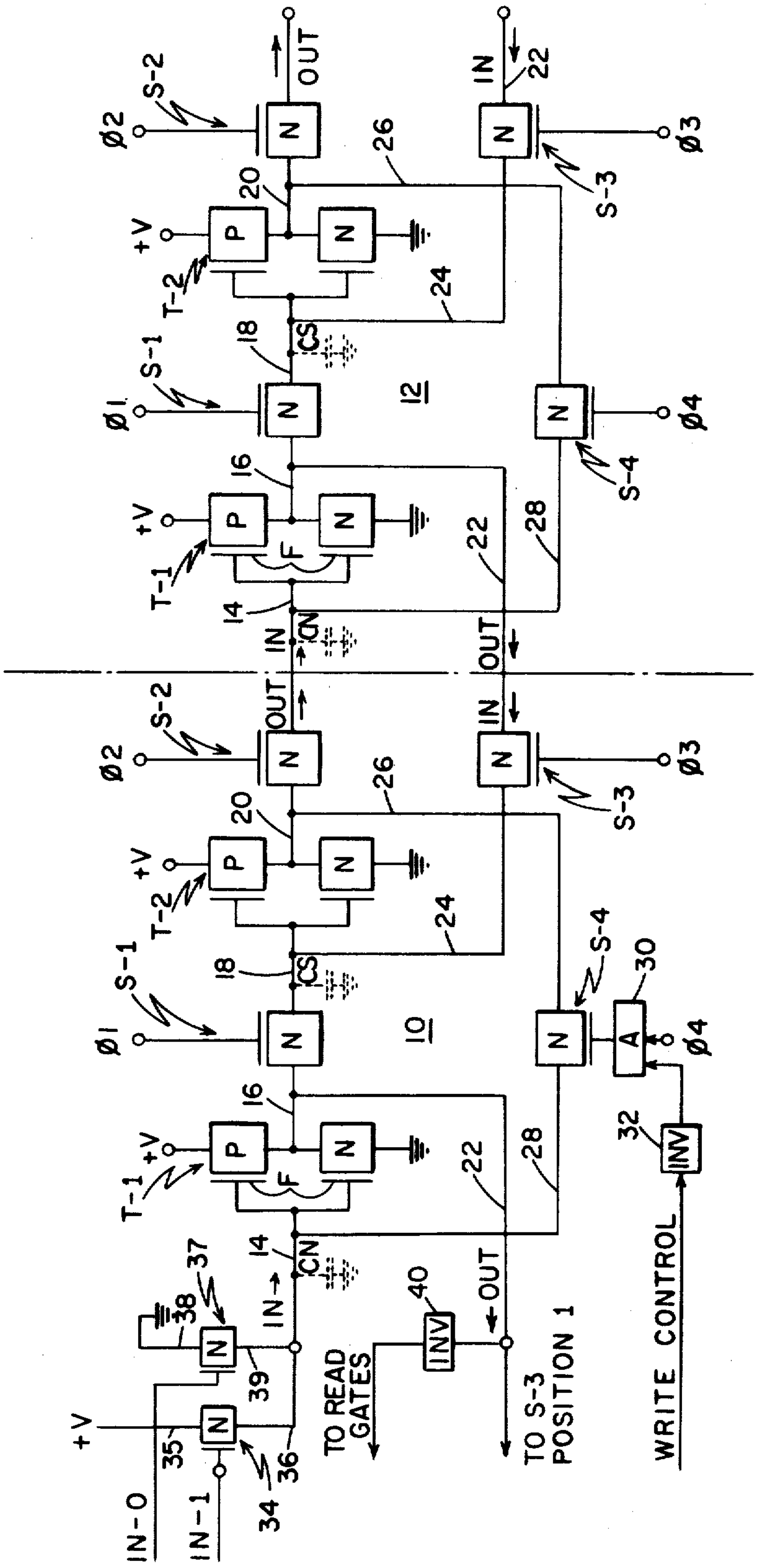
FIG. 3 illustrates the circuitry of a two-way static shift register which may be used in the embodiment of FIG. 1.

FIG. 2 illustrates the manner of shifting and accessing the pages of a class of registers. In this Figure the rectangles with oppositely directed arrows and line connections are symbolical of the topological units or storage cells of a two way static shift register such as shown in FIG. 3 and herein after described. Only two of the registers of the class are indicated, these being the first order data register $d_0$ and the opposite end register *f* for the flag bit. It will be understood that between the two indicated registers are the remainder of the data registers *d* and all of the address registers *a* of FIG. 1, these having the same number of storage cells as the two registers shown and the same shift connections for shifting all registers in unison. Also, the cells between 1 and K—4 to K of the two registers shown are omitted.

In FIG. 2, all registers are connected for shifting in two different loops, a loop $L_1$, left shift in the Figure, which includes the K position, and a loop $L_2$, right shift in the Figure, which includes all positions except K. Read and write access is had to each bit position of a page in the K position as indicated by the lines labeled OUT and IN, respectively. Therefore, the class may be initially loaded with pages by alternately writing in the cells of position K and then shifting their contents one shift in loop $L_1$, K times. The first two pages entered, which will end up in positions K and K-1 when loading is completed, have their flag bits set at 1 while all the other flag bits are entered 0.

A request for access to the class in the form of the address of the desired page is compared with the address bits of the page in position K, read out to the comparison circuitry. If there is a match, the requesting unit is signaled, there is no shifting, the read/write circuits to position K are conditioned and the requested access is obtained. However, if there is no match on the first address comparison from position K, the registers are shifted once on loop $L_1$, putting the page last in position K with its flag bit at 1 in position 1 of the class and the page last in position k-1 in position K. The address bits of the new page in position K are compared with those of the requested page and, if a match is obtained, access is provided as in the case of a match on the first comparison. If there is no match, the flag bit of the page formerly in position K-1 is changed from 1 to 0 and the search continues by alternately shifting in loop $L_1$ and comparing the address of the page newly entering position K until a match is obtained.

Any match after the first comparison not only provides access to the matched page in position K as explained above but also causes register positions 1 through K-1 to shift in the reverse direction in loop $L_2$ until the page originally in position K reaches position K-1. This is the only page in loop $L_2$ having a flag bit set at 1, this bit being read out on the line labeled OUT K-1 to terminate the shifting. Such match also causes the flag bit of the page in position K to be changed to 1 if it was not already set at 1 (i.e., if the match occurred on the first shift on loop $L_1$, with the page previously in position K-1 which had its flag bit set at 1).

Thus, on any match after the first comparison, the class is reordered to the extent that the page in access position K when the request was received (then the last previously accessed page and now next to last) is exchanged for the requested page but located in position K-1 where it is closest in the direction of shift to the comparison-access position K. Similarly, the page in position K-1 when the request was received, if it was not the requested page, is now in position K-2, and all pages then in positions between K-1 and the position containing the requested page are now one further order removed from the access position K in the direction of shift in loop $L_1$. Thus, regardless of how they were originally ordered, once all pages of a class have been accessed they are all reordered in the direction of shift in loop $L_1$, in terms of recency of access, from the newest in position K to the oldest in position 1. Since the K position is excluded from the reordering shift loop $L_2$, the requested page therein remains accessable despite shifting in that loop.

In a shift register storage system wherein the pages are maintained in a fixed sequence which the system of FIG. 2 would be without the reverse shift loop $L_2$, the access time is the number of shifts required to locate the requested page times the shift rate, and the average access time is (K-1)/2 times the shift rate, where K is the number of pages in the class. In the reordered system according to FIG. 2 the access time is the number of shifts required to locate the requested page times the shift time plus the number of shifts required to place the last previously accessed page in position K-1 times the shift time. Nevertheless, the system according to FIG. 2 can reduce the average access time very substantially as compared with a fixed sequence system where certain pages of a class are referenced with much greater frequency than others, which is usually the case with program-controlled storage access.

For example, assume a program using only 10 of 61 pages of a class. After all 10 pages have been referenced once in the system according to FIG. 2 they will be located in positions K to K-9. If they are thereafter accessed by the program with equal frequency, the average access time would be 9 times the shift time as compared with 30 times the shift time in the fixed sequence storage system. If the program used a few of the 10 instructions with much greater frequency than the others, the average access time in the system according to the invention would be still further reduced.

In utilizing a memory made up of separately accessible page classes equipped for page reordering in accordance with this invention it is desirable that certain pages which it is realized will be used much more than others, or will be used exclusively by a number of programs, be distributed for storage in several of the classes. In this way, frequently used pages will segregate toward the comparison-access position so as to be more quickly accessible than if they were all contained in a single class; the time for accessing a limited number of pages used by certain programs is also reduced. For instance, if the 10 pages of the example given above were distributed two each to five classes, the average access time after each had been once accessed would be reduced to at most twice the shift time. In addition, such recommended distribution reduces the likelihood of immediate repeated requests for access to the same class.

In order to obtain the advantage of priority searching of a limited group of pages which are used most frequently, some data processing systems have been equipped with extra registers in which such pages are stored in duplicate. The page addresses of these extra registers are searched first and the class which they partially duplicate is searched only if the requested address is not found in the extra registers. By rather elaborate controls, the pages in the extra registers are updated according to recency of use.

The system of the invention according to FIG. 2 and other Figures yet to be described has many advantages over this prior system. One such advantage is greatly simplified hardware and controls. For example, the extra registers and page duplicating read-out equipment from the registers or positions of the main class are eliminated. The shift connections are simply, dynamically controlled. Operation is simplified. Problems of changing pages stored in duplicate are avoided. There is no double searching of the same page as may occur in the prior system. And in the system of FIG. 2 all pages of a class are searched on a priority based on recency of use once all pages have been accessed.

Figure 7:
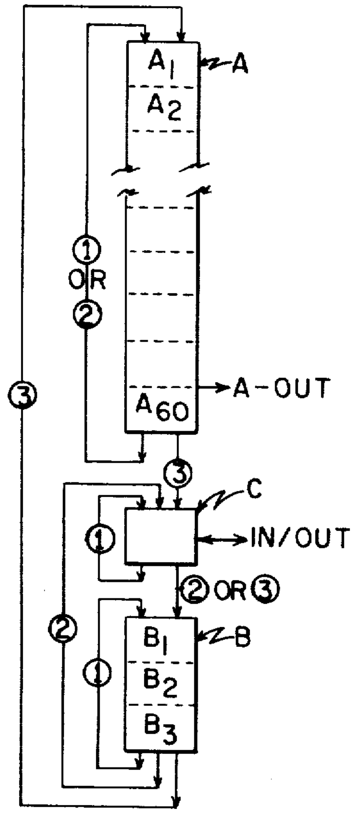
FIG. 7 indicates in block diagram a class of another embodiment, this one using unidirectional dynamic shift registers, illustrating the manner of shifting.
Figure 9:
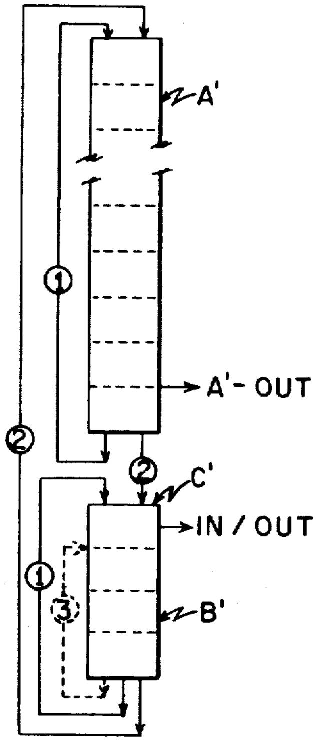
FIG. 9 is a view similar to FIG. 7 of a modification using static shift registers.

FIGS. 7 and 9 show in similar simplified diagram modifications which involve even less hardware and cost than the system of FIGS. 1 and 2 although not obtaining the full advantages of that system.

FIG. 7 contemplates the use of unidirectional dynamic shift registers (i.e., registers which shift on a continual basis in one direction to maintain the stored values), these involving less hardware than the registers used in the FIGS. 1–6 embodiments. As in FIG. 1 the registers extend longitudinally of the diagram and there are sufficient of them for all the data and address bits of a page in each position but there is no flag bit register. The register positions are organized into three sections A, B and C indicated by separated solid-line rectangles, having different shift connections. Sections A and B are multiple position groups, the positions being indicated by dash lines, while section C is a single position and is the access position as indicated by the double arrow labeled IN/OUT. For the sake of illustration, the class is assumed to have 64 page positions with 60 of these located in section A ($A_1$–$A_{60}$) and 3 in section B ($B_1$–$B_3$ ), although the total positions of the class and their distribution between the A and B sections may be as desired.

Each section has a shift loop which shifts back on itself as indicated by a solid appropriately arrowed line, symbolic of corresponding shift lines of each register of the group. These loops are marked 1 and are the normal shift loops to maintain the stored values, the shifting being constant therein except during certain accessing operations. Sections B and C have a second shift loop which includes both of these sections so that the pages in B may be shifted through C and the page in C may be shifted through B. During shifting of sections B and C in loop 2, section A continues to shift in its normal loop which is therefore marked 1 OR 2. There is a third shift loop marked 3 which includes all three sections, so that a page $A_{60}$ in section A may be shifted into section C, the page in section C may be shifted into position $B_1$ of section B and the page $B_3$ in section B may be shifted into position $A_1$ of section A. Since the connection between the C and B sections is the same for loops 2 and 3 it is marked 2 OR 3.

A request for a page in the form of its address bits is compared with the address bits of the page in section C. At this time the three sections are shifting in their normal loops 1. If there is a match there is no change in the shifting, the requesting unit is notified and read/write lines to each register cell of section C are conditioned. (Since C shifts back on itself the page is maintained available. However, if desired that data out lines may feed a latch so that repeated reference thereto may be made without shifting C). If a match is not obtained, C and B are changed to shift loop 2 so that the pages in B may be successively shifted through C and their addresses compared with the request. If there is a match, the shift connections are changed to loop 1 so that the requested page may be accessed as above.

If the search of the pages in C and B produces no match, these sections may continue to shift in loop 2 without further address comparison or may be returned to loops 1. The addresses now compared are those of the pages in section A while are shifted in the 1 OR 2 loop, their address bits being read out to the comparison circuitry successively as they are shifted into the $A_{60}$ position, as indicated by the arrowed line labeled A OUT. When a match is obtained all sections are switched to shift loop 3 and shifted once, after which they are switched back to shift loops 1. The single shift in loop 3 shifts the matched page in $A_{60}$ into section C, the page in C to position $B_1$ of section B and the page in position $B_3$ of that section into position $A_1$ of section A, thus exchanging a page from B for the page shifted from A to C. Accessing of the matched page now in section C is as previously explained.

Since the shifting of sections A and B in loops 1 is unidirectional and the registers are dynamic, the location of the pages in the several positions thereof is random at any particular time. This is a distinct disadvantage over the embodiment represented by FIGS. 1 and 2 in that on any request for access the pages in section B are not necessarily searched in the order of recency of use. Further, the pages in B are not necessarily the group, 3 in FIG. 7, which were accessed immediately before the page in section C, since the page exchanged from $B_3$ to $A_1$ whenever A is searched may be any page in B. However, the probabilities are that the B section will contain at any one time all or nearly all the group of pages, corresponding in number to the number of positions in B, which were accessed most recently before the page in section C. Of course, this difficulty could be remedied either by providing static storage in section B or by counting shifts in section B and shifting in loops 2 or 3 only when the order in B is that desired. However, the gain may not be worth the added cost.

If the B section is relatively large, considerable search time may be saved by simultaneously comparing the requested address with the address of the page in C and the address of the page being shifted into the A position closest to C, position $A_{60}$ in FIG. 7. Separate comparison circuitry on A-OUT would then switched the shifting to loop 3 if a match occurred while C or B was being searched.

FIG. 9 is a view similar to FIG. 7 illustrating a modification thereof utilizing unidirectional static shift registers. In this modification, the register positions are divided into only two groups A′ and B′, the access position C′ being the first position of the B′ section. Each section is shifted only during searching and in only two loops, one marked 1 in which each section is shifted back on itself, the other marked 2 in which the loop includes both sections. As in FIG. 7, a requested address is initially compared with the address of the page in the access position C′. If a match occurs with the C′ page, there is not shifting and accessing takes place as in FIG. 7. If there is no match, section B′ is shifted in loop 1, successively presenting the pages therein to position C′ for address comparison. If a match occurs, the shifting is terminated and access takes place from position C′. If there is no match, shifting of B′ terminates after one more shift to restore the original order of pages. Section A′ is shifted in loop 1 until a match occurs at A′-OUT, where upon both sections are shifted once in loop 2 and the shifting is terminated. This places the matched page in position C′ and the page at the bottom position of B′ in the top position of A′. As in the case of FIG. 7, A′ and B′ may be simultaneously shifted and searched by separate comparison circuitry, in which case a match at A′-OUT has the effects just described, while a match at C′ terminates all shifting and conditions the access circuitry to C′ as above.

FIG. 9 has the advantage of less shift loops than FIG. 7 although it may require some more hardware in the registers. However, like the FIG. 7 embodiment, there is no assurance that the B′ section will contain only the most recently used page or that the pages in B′ will be searched in any particular order. The extra shift of the B′ section, when no match is obtained there, returns the most recently used page to the C′ position, since otherwise, being in the bottom position of B, it would be undesirably shifted into the A′ section by the shift in loop 2 which inserts the matched page into the top position of section B′. However, the most recently used page is then shifted into the top position of section B′ by said loop 2 shift where it will be the last position of B′ searched on the next request. Moreover, whenever a match is obtained with a page within the B′ section, the order of pages in that section is changed. If the matched page was in the top position of section B′ when the search commenced, the last previous page will be the first one compared on the next search, but not otherwise. Hence the order of search of section B′ is really random and any page of B′ may be exchanged with A′.

Considerable improvement may be obtained in the FIG. 9 embodiment, utilizing one way static shift registers, by adding a third shift loop for shifting the positions of the B′ section excluding the C′ access position, as indicated by the dotted arrowed line marked 3. With this modification, if a match occurs with a page in the B section other than the one in its top position when the search commenced, the shifting is switched to loop 3 and continued until the total shifts in loops 1 and 3 equals the number of positions in section B excluding C. This places the most recently accessed page in the bottom position of B′ for first comparison on the next search. If there is no match with a page in the B′ section, instead of the extra shift in loop 1, the B′ section excluding the C′ position is shifted in loop 3 a number of shifts equal to one less than the number of positions in the B′ section excluding position C′. This shifts the most recent previously accessed page from the bottom position of section B′ to its next to bottom position, from which it will be transferred to the bottom (first search) position by the shifting of the matched page from the A′ section position C′ in loop 2.

With the third shift loop and controls as just described the FIG. 9 embodiment becomes capable of retaining in the B′ section all the most recently accessed pages up to its capacity, and of maintaining them in the search order of most recently to least recently accessed. The controls required are not elaborate. A shift counter or equivalent (which would also be required in FIG. 7 or FIG. 9 as shown to terminate shifting of the B or B′ section), plus switches operated thereby to alter or terminate the shifting is all that is required. However, even so, the system of FIG. 9 will still lack the important feature of FIGS. 1 and 2 embodiment of complete ordering of a class (and of a memory) according to recency of use.

b. Explanation of More Detailed Circuitry

Reverting now to the embodiment generally illustrated by FIGS. 1 and 2, of the many known configurations of two-way static shift registers that may be used therein, the one illustrated in FIG. 3 may be regarded as preferred for reasons of rapidity of shift, durability and low hardware cost. Referring to FIG. 3, this illustrates two positions or cells of what is known as a "2-Way Static 4-Phase Mosfet Shift Register". For purposes of illustration, the two cells 10 and 12 of this Figure, to the left and right, respectively, of the dashed separation line, may be considered as bits of the K and K−1 positions, respectively, of a register of the FIG. 2 diagram.

In each cell of FIG. 3, pulse values of 1 or 0 are received and stored in a capacitance labeled CN which is indicated in dotted lines since it will usually be only the capacitance between an input line 14 and ground. Line 14 is connected to the field plates F of a complementary field effect transistor T-1 which has a p-channel conductor P connected to a source of positive voltage +V and an *n*-channel conductor N connected between conductor P and ground. A line 16 has one end thereof connected to the circuit between conductors P and N. Transistor T-1 operates in the usual manner to produce in line 16 the invert of the charge on line 14. This is because a positive charge applied by line 14 to the plates F of the transistor renders conductor N relatively freely conductive and conductor P relatively non-conductive so that line 16 goes essentially to ground potential. Conversely, a zero or negative charge on line 14 renders conductor P relatively freely conductive and conductor N relatively non-conductive so that line 16 goes essentially to the positive potential applied across conductor P. Transistor T-1 serves to isolate electrically line 14 from line 16 and to inhibit decay of the potential on 14.

Line 16 is connected to a line 18 through a field effect transistor having a single *n*-channel conductor N which is rendered conductive to shift the potential on line 16 to line 18 by the first phase (0 1) of a four phase positive shift pulse train applied to its plate. This transistor therefore functions simply as a switch and is designated S-1. The potential shifted to line 18 is stored in a capacitor CS, which again is indicated in dotted lines as it may simply be the capacitance between the line and ground. Line 18 is connected to the plates of a transistor T-2 which is the same as transistor T-1, connected in the same way, so that the potential on line 18 appears inverted on a line 20 connected as the line 16. Therefore, line 20 receives a potential corresponding to that originally applied to input line 14. On a right shift in FIG. 3, the potential on line 20 is shifted to a line marked OUT, connected to the input line 14 of the next cell 12, by the phase 2 pulse applied to transistor switch S-2 which is the same as switch S-1.

For shifting left in FIG. 3 a line 22 is connected to line 18 of cell 12 and through switch S-3 of cell 10 to line 18 of cell 10. A phase 3 pulse applied to transistor S-3 therefore shifts to line 18 of cell 10 the potential on line 16 of cell 12, which, by virtue of transistor T-1 of cell 12, is the invert of the potential on its line 14. The potential shifted to line 18 is inverted on line 20 of cell 10 by its transistor T-2 and therefore the potential on line 20 of cell 10 corresponds to that on the input line 14 of cell 12. This potential on line 20 of cell 10 is shifted to input line 14 thereof via line 26 connected to said line 20, transistor switch S-4 of cell 10, and line 28 connecting transistor S-4 to input line 14 of cell 10, by a phase 4 pulse applied to switch S-4.

It will be apparent from the foregoing that each cell can be operated as a static storage device by alternately pulsing its S-1 and S-4 switches without pulsing S-2 and S-3. The pulse on S-1 causes line 20 to be at a potential corresponding to that of line 14 which is shifted back to line 14 to maintain the stored potential, by the pulse applied to switch S-4.

Data may be read into any cells by applying the corresponding potential to the input line 14 thereof, while neither of switches S-2 and S-4 is operating to cause a possible conflict of potentials applied to line 14. Data may also be read out from any data cell from line 16 via output line 22 at any time switches S-2 and S-4 are not operating and also while the cell is in the static condition with only switches S-1 and S-4 operating in alternation.

FIG. 3 shows read-in or write and read-out connections from cell 10, assuming it to be a data cell of position K. In the embodiment of FIG. 2, data is written in or read out only from the K position data cells and only while they are in the static or hold state. Since in the static state the S-1 and S-4 switches are pulsed in alternation and since a write may no coincide with pulsing of S-4, the phase 4 pulse is applied to data cells 10 through an AND gate 30, the other terminal of which is conditioned via a line labeled WRITE CONTROL, through an inverter 32. Thus, AND gate 30 is conditioned except when a WRITE CONTROL signal inverted is applied thereto. Simultaneously with the WRITE CONTROL signal, data is read into input line 14 by the write circuitry shown. This circuitry assumes a write input from flip flop type devices which produce an output on one of two lines depending on whether the value is 1 or 0. An IN-1 output on a line so marked conditions a transistor switch 34 (like switches S-1 to S-4) to transmit a positive voltage +V on line 35 to line 36 and line 14. An IN-0 output on a line so marked conditions transistor switch 37 to connect conductor 14 to ground potential via lines 38 and 39.

Data read-out from each cell 10 is from a connection to line 22 through an inverter 40 to a line marked TO READ GATES. The inverter is necessary since line 22 is at an inverted potential to that on line 14 which it is desired to read, and it may be a complementary field effect transistor like T-1 and T-2. No inhibit circuitry is needed since read-out may take place while the S-1 or S-4 switches are pulsed and these are the only switches pulsed in the static state. Line 22, being the output line, also goes to the S-3 switch of position 1, as indicated on the drawing.

The read-out connections for the address cells of position K to the comparison circuitry may be the same although they operate first while the cell is in the static state and thereafter, if K does not contain the desired page, as each new page and its address is shifted from position K-1 into position K. During each left shift of a search in which switches S-3 and S-4 are alternately pulsed, the new shifted address value inverted replaces the previous value on line 22 and the read-out circuitry again inverts to the shifted value. It should be noted that read-out of data and addresses could be from line 26 without inversion but this would require an additional readout line to line 22 which would, undesirably, either make cell 10 of different construction than the others or require the additional and unused read out line in all the other cells.

Figure 4:
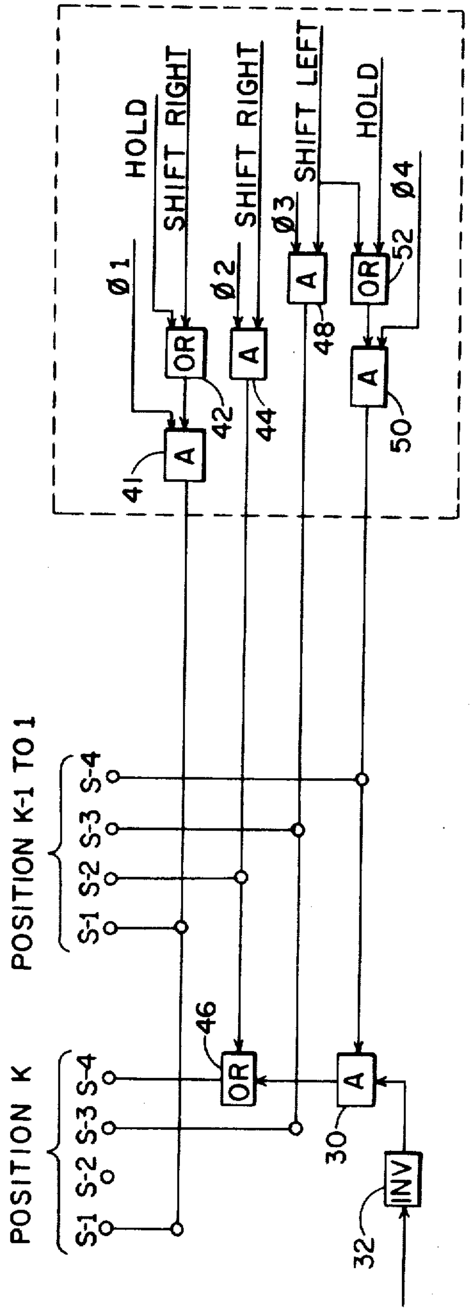
FIG. 4 illustrates shift phase connections to positions K and K-1 to 1 respectively of FIGS. 1 and 2.

FIG. 4 diagrams suitable shift phase pulse connections to the switches S-1 to S-4 of positions K (cell 10, FIG. 3) and K-1 (cell 12, FIG. 3). The phase 1 pulse on a line so marked is applied to a line connected to the S-1 switch of all cells through an AND gate 41 the other terminal of which is conditioned by either a HOLD or a SHIFT RIGHT signal on lines so marked through OR gate 42. The phase 2 pulse on a line so marked is applied to a line connected to the S-2 gates of all cells except position K through AND gate 44 the other terminal of which is conditioned by a SHIFT RIGHT signal on a line so marked. In the case of position K, the phase 2 pulse is applied through OR gate 46 to switch S-4, and its S-2 switch is inoperative. The reason for this is that switch S-2 is operated only on a right shift and position K does not participate in a right shift. While a right shift is in progress in the other cells of the registers, position K is in the hold, static state which calls for pulsing of its switches S-1 and S-4 in alternation. Its switch S-1 is pulsed on a right shift from the phase 1 line and its S-4 switch is pulsed from the phase 2 line via the OR gate 46.

The phase 3 pulse on a line so marked is applied to a line connected to the the S-3 switches of all cells via and AND gate 48 the other terminal of which is conditioned by a SHIFT LEFT signal on a line so marked. The phase 4 pulse on a line so marked is applied to a line connected directly to the S-4 switch of cells K-1 to K, and to the cells of position K via AND gate 30 (see FIG. 3) and OR circuit 46, by way of AND gate 50, the other terminal of which is conditioned by either a SHIFT LEFT or a HOLD signal on lines so marked through OR gate 52.

Figure 5:
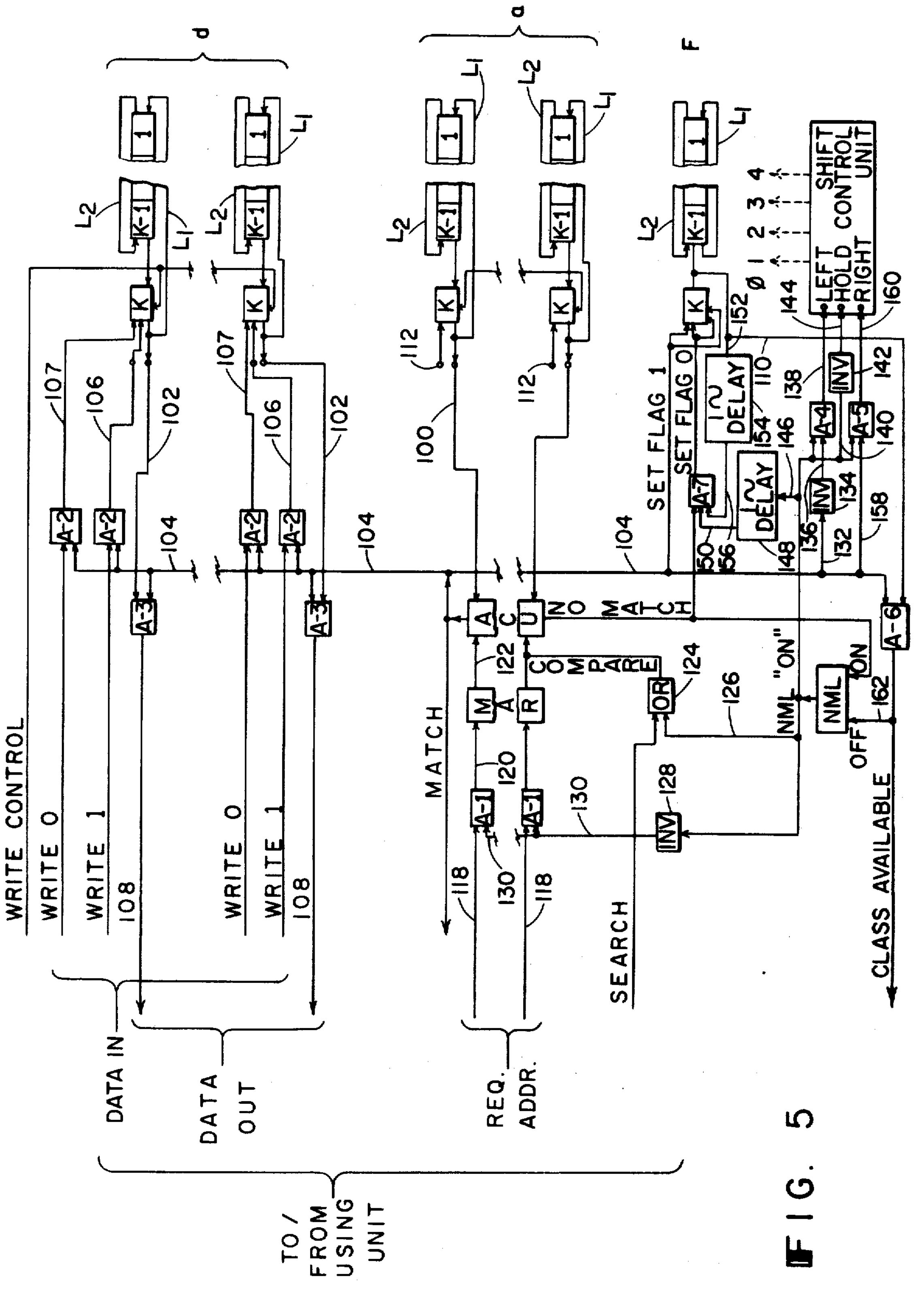
FIG. 5 shows in block diagram controls for operating the registers of the embodiment of FIGS. 1–4 and for reordering their pages according to the invention.

The control circuitry just described which is enclosed in the dashed line rectangle in FIG. 4 may be utilized as the SHIFT CONTROL UNIT of FIG. 5.

FIG. 5 shows control circuitry for the registers of a class according to the embodiment diagrammatically illustrated in FIG. 1 and 2, utilizing shift registers and connections according to FIGS. 3 and 4. There are *d* data registers (first and last only shown), *a* address registers (first and last only shown) and a single flag bit register F, positions K (access), K-1 (nearest) and 1 (most remote) being shown. The two shift loops for the registers are designated as in FIG. 2, $L_1$ for the left shift loop including position K, and $L_2$ for the right shift loop excluding position K.

The address bits of the K position of the address registers are applied over lines 100 to corresponding terminals of an Address Comparison Unit labeled ACU. Each K position bit of the data registers has an output line 102 from its output circuitry of FIG. 3 to an AND gate designated A-3, the other terminal of which is conditioned from a line 104; and two input lines 106, 107 from two AND gates A-2 which are connected respectively to the line IN-1 and IN-0 of each bit (see FIG. 3). The A-3 AND gates have DATA OUT lines 108 for transmitting the data from the corresponding K positions of the data registers to the using unit of the system. The A-2 AND gates have input lines WRITE 1 and WRITE 0 respectively from the data source of the system which condition one terminal of these respective AND gates, the other terminal thereof being conditioned from line 104. (The input lines (not shown) to input terminals 112 of the K positions of the address registers would be utilized only when initially loading all registers of the class and may, for example, come from a counter.)

The K position of the flag register may have write connections as on FIG. 3 but has no read-out connection. It has an input line SET FLAG 1 from line 104 to the IN-1 line and AND gate 30 of the input circuitry. It has an input on line SET FLAG 0 from AND gate A-7 to the IN-0 line and AND gate 30 of the input circuitry. A read-out is provided from the K-1 flag bit position the circuitry for which may be the same as in FIG. 3. The read-out is on line 110 (through an inverter as in FIG. 3) to condition one terminal of AND gate A-6.

A using unit requesting access to a page sends each of the address bits thereof over lines 118 to AND gates A-1 which are conditioned as hereinafter explained and from which the bits are passed by lines 120 to corresponding bit positions of a Memory Address Register labeled MAR. The bits from the MAR are in turn applied to corresponding terminals of the Address Comparison Unit ACU by lines 122. While only two of the lines and gates mentioned in the preceding sentence are shown in FIG. 5, these corresponding to the two-out-of-*a* address registers shown, it will be understood that there will be *a* such lines and gates.

The ACU may utilize conventional comparison circuitry which produces an output on a line labeled NO MATCH when any of the compared bits are not the same and an output to a line labeled MATCH when all compared bits are the same. The ACU circuitry shown in FIG. **5*a* is hereinafter described. The MAR is a conventional storage register which applies its 1 or 0 bit values to lines 122**.

Simultaneously with loading the MAR, the using unit sends a signal on a line labeled SEARCH which, through OR gate 124 and a line labeled COMPARE, activates the comparison circuitry. If the requested address is that of the last accessed page, that page will be in position K and the ACU will provide an output to the line labeled MATCH which signals the using unit that the desired page is in access position. Also, the output on the MATCH line goes to line 104 and conditions the AND gates A-2 to apply the data signals, if any, provided by the using unit on the WRITE 1 or WRITE 0 lines to the input circuitry of the K position data cells, the using unit also providing a signal on the WRITE CONTROL line to inhibit switches S-4 (FIG. 3). The MATCH signal on line 104 also conditions the AND gates A-3 for read-out, so that the using unit can read or write at its election. The MATCH output to line 104 also conditions one terminal of AND gate A-6 the other terminal of which is conditioned by read-out of the flag bit 1 in position K-1 to provide a signal to the using unit on a line labeled CLASS AVAILABLE, signifying that the using unit may start another search as soon as it has completed its read or write operation. Read/write gates A-2 and A-3 will remain conditioned as long as the using unit conditions the SEARCH line.

If the requested address is not in the K position, the resultant ACU output on the NO MATCH line turns on a No Match Latch designated NML in the drawing. The output from the latch NML to a line labeled NML "ON" goes via line 126 to OR gate 124 to lock the ACU in search-compare condition. Also the requested address input gates A-1, previously conditioned from the NML "ON" line through inverter 128 and line 130, since the NML latch was off, are now deconditioned by the output on NML "ON". The output on line NML "ON" also conditions one terminal of AND gate A-4, the other terminal of which is conditioned by the absence of a MATCH output on line 104 by line 132, inverter 134 and line 136. The output of gate A-4 on line 138 is applied to the shift left lines of the shift control circuitry of FIG. 4 as indicated in FIG. 5 by the block labeled SHIFT CONTROL UNIT and its terminal labeled LEFT to which line 138 is connected. The HOLD control lines of the shift control circuitry, previously activated by absence of output on the NML "ON" line via line 140, inverter 142 and line 144 to the HOLD input of the SHIFT CONTROL UNIT, are now inactivated by the inverted output from line NML "ON".

On completion of the first left shift, one terminal of 3-way AND gate A-7 is conditioned by the output on line NML "ON" via line 146, one shift delay 148 and line 150. A second terminal thereof is conditioned by the flag bit 1 sensing line 110, which sensed the 1 flag bit in position K-1 at the start of the previous cycle, via line 152, one shift cycle delay 154, and line 156. If the first left shift does not produce a successful comparison, the resultant output on the NO MATCH line conditions the third terminal of AND gate A-7 via line 157 resulting in an output therefrom on the SET FLAG 0 line therefrom to the zero input circuit of the flag bit in position K, changing it from 1 to 0. The purpose of this is to maintain the flag bit of the page previously in position K as the only 1, since it is now the previously most recently used page, ultimately destined for position K-1.

On the other hand, if the first left shift does produce a successful comparison, the absence of output on line NO MATCH inhibits gate A-7 while the presence of the MATCH output on line 104 conditions the line SET FLAG 1, which is not effective in this one instance since the flag is already set 1, but is effective on any shift left after the first in which there is a match. The absence of input to AND gate A-7 from the NO MATCH line prevents conflict between SET FLAG 1 and SET FLAG 0 when the desired page is in K-1.

Also, if the first left shift produces a successful comparison, the MATCH output signals the using unit and conditions the read and write gates as previously described. In addition the MATCH output on line 104 deconditions AND gate A-4 by reason of inverter 134 and conditions one terminal of AND gate A-5 via line 158, the other terminal of which is conditioned by the latch output on the line NML "ON". Gate A-5 conditions the SHIFT RIGHT lines of FIG. 4 to cause a first shift right as indicated on FIG. 5 by the line 160 connecting gate A-5 to the RIGHT terminal of the SHIFT CONTROL UNIT. Since it is here assumed that the desired page was found on the first left shift, the first right shift moves the page last previously in the access K position, and which has the flag bit 1, from position 1 to position K-1, while position K remains in the HOLD state for access by reason of the connections to K switches S-1, S-4 from the right shift lines in FIG. 4.

As the flag bit 1 is shifted into K-1, its read-out on line 110 conditions one terminal of gate A-6, the other terminal of which is conditioned by the MATCH output to line 104. The output from gate A-6 turns off the NML latch via line 162 to its OFF terminal and sends the CLASS AVAILABLE signal to the using unit. The absence of output on the NML "ON" line deconditions gate A-5, maintains gate A-4 deconditioned, and restores all register positions to HOLD via line 140, inverter 142, line 144 and the HOLD connections of FIG. 4.

It will be appreciated that when the desired page is not located by the first and second comparisons, the left shift continues until the desired page reaches position K, because the presence of output on the NML "ON" line and the absence of output on line 104 maintain gate A-4 conditioned and gate A-5 and the HOLD connections deconditioned. The resultant MATCH output then produces the same operations just described for the case of a match on the first shift, except that the number of right shifts will be more than one and equal to the number of left shifts which were made in locating the desired page.

The comparison circuitry of the ACU illustrated in FIG. *5a* utilizes EXCLUSIVE OR gates 170 the two input terminals of which are connected, respectively, to lines 100 from the K position address bits and lines 122 from the MAR address bits. The output lines 172 of gates 170 are connected to an OR gate 174. The output line 176 of the OR gate is connected to one terminal of a first AND gate 178 and, through inverter 180, to one terminal a second AND gate 182. The other terminals of AND gates 178 and 182 are conditioned from the COMPARE line of FIG. 5. An output from gate 178 is applied to the NO MATCH line whereas an output from gate 182 is applied to the MATCH line.

Since a two-terminal EXCLUSIVE OR gate has an output if, and only if, its two inputs are different, any difference between the values of corresponding bits on lines 100 and 122 produces an output from their gate 170 which is applied to line 176 through OR gate 174 and through gate 178 to the NO MATCH line, whereas by reason of inverter 180 there is no output on the MATCH line. When all compared bit values are the same, there is no output from gates 170, OR circuit 174 or gate 178 to the NO MATCH line whereas inverter 180 produces an output from gate 182 on the MATCH line.

Figure 6:
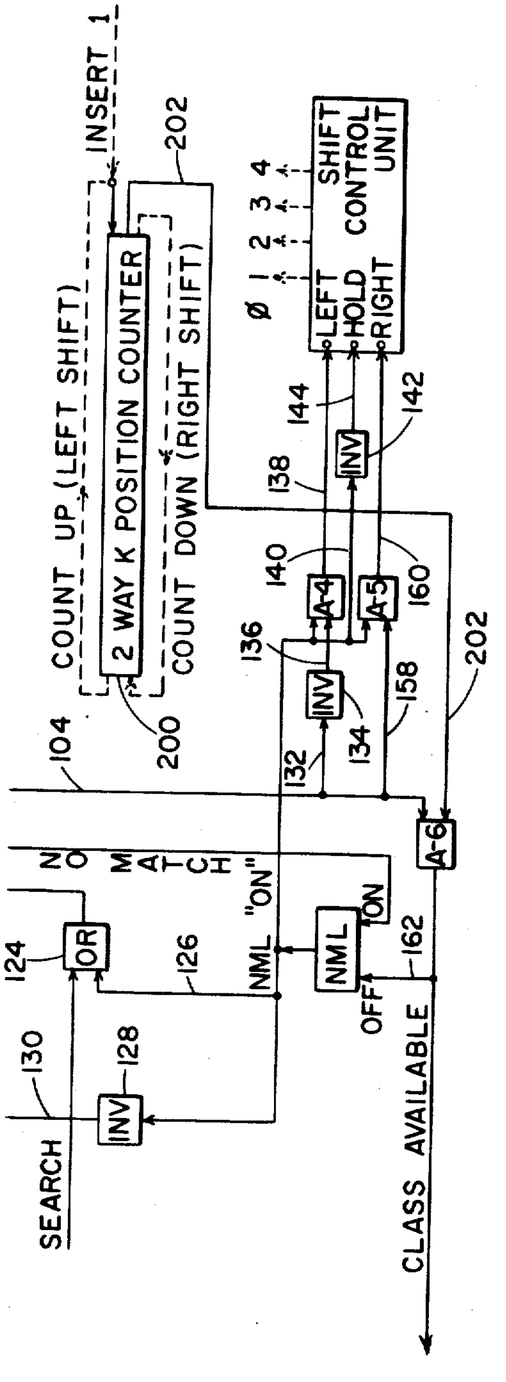
FIG. 6 illustrates a modification of the controls of FIG. 5.

FIG. 6 shows a modification of part of the circuitry of FIG. 5 in which the flag bit register and controls operating on and from it are eliminated and replaced by a two-way counter and controls. Circuitry which is the same as in FIG. 5 has the same reference numerals. The data and address registers and the operating connections to and from them and the using unit may be the same as in FIG. 5 and are therefore not shown in FIG. 6.

The block 200 labeled 2 WAY K POSITION COUNTER in FIG. 6 may be any suitable counter capable of counting in one direction as "up" the number of left shifts of the shift circuitry on a search until the desired page is found, and then counting in the reverse direction or "down" until the count returns to zero which is signaled by an output. Since it fits so well with the control circuitry of FIG. 4, counter 200 is assumed to be a two-way static shift register the same as the address and data registers of FIG. 5 and connected in the same manner to the shift controls of FIG. 4. When the registers of the class are initially loaded, a positive or "1" charge is inserted in the 1 position cell at the right hand end of the counter, as indicated by the dotted line labeled INSERT 1 in FIG. 6, which is permanently stored in the counter, all other cells being at zero.

When the data and address registers are shifted left in FIG. 5 by the conditioning of AND gate A-4 and the left shift control circuitry of FIG. 4, counter 200 is shifted left in unison therewith by the same control circuitry, thus transferring the 1 from position 1 successively to the cells to the left at each shift, thus counting the number of left shifts or counting "up", as indicated by the shift left loop in FIG. 6 labeled COUNT UP (LEFT SHIFT). When the desired page is located and the data and address registers are shifted right by conditioning of AND gate A5 and the right shift circuitry of FIG. 4, counter 200 is shifted to the right in unison with the other registers, as indicated in FIG. 6 by the shift right loop labeled COUNT DOWN (SHIFT RIGHT). When the count down equals the count up the page in the K position at the start of the search will be in position K-1 and the 1 value will have returned to counter position 1 where it is read out on line 202 to gate A-6, with the same consequences as reading out flag 1 from position K-1 in the FIG. 5 embodiment, including restoring all registers including counter 200 to the HOLD condition.

While similar in operation to the flag register of the FIG. 5 embodiment, the counter of FIG. 6 eliminates the circuitry required in FIG. 5 to change the flag bit from 0 to 1 and vice versa (AND gate A-7 and connections plus SET FLAG 1 line).

The time required to restore the last previously accessed page to the K-1 position can be shortened by providing a second shift left loop for the registers which excludes position K and providing further controls which will cause the positions K-1 to 1 to shift left in this second loop if the number of shifts in the first shift left loop before the desired page is located in position K exceeds the number K/2. Thus, if the requested page was located in position 1 at the start of the search the suggested modification would locate the last previously accessed page in position K-1 when the position 1 page reaches position K. Hence no further shifting would be necessary. Similarly the number of further shifts required after the desired page is located by a number of shifts $N > K/2$ would be shortened by K–N. However, the reduction in availability lag after accessing a page remote from the K position may not be sufficiently important to warrant the extra shift and control circuitry required.

Figure 8:
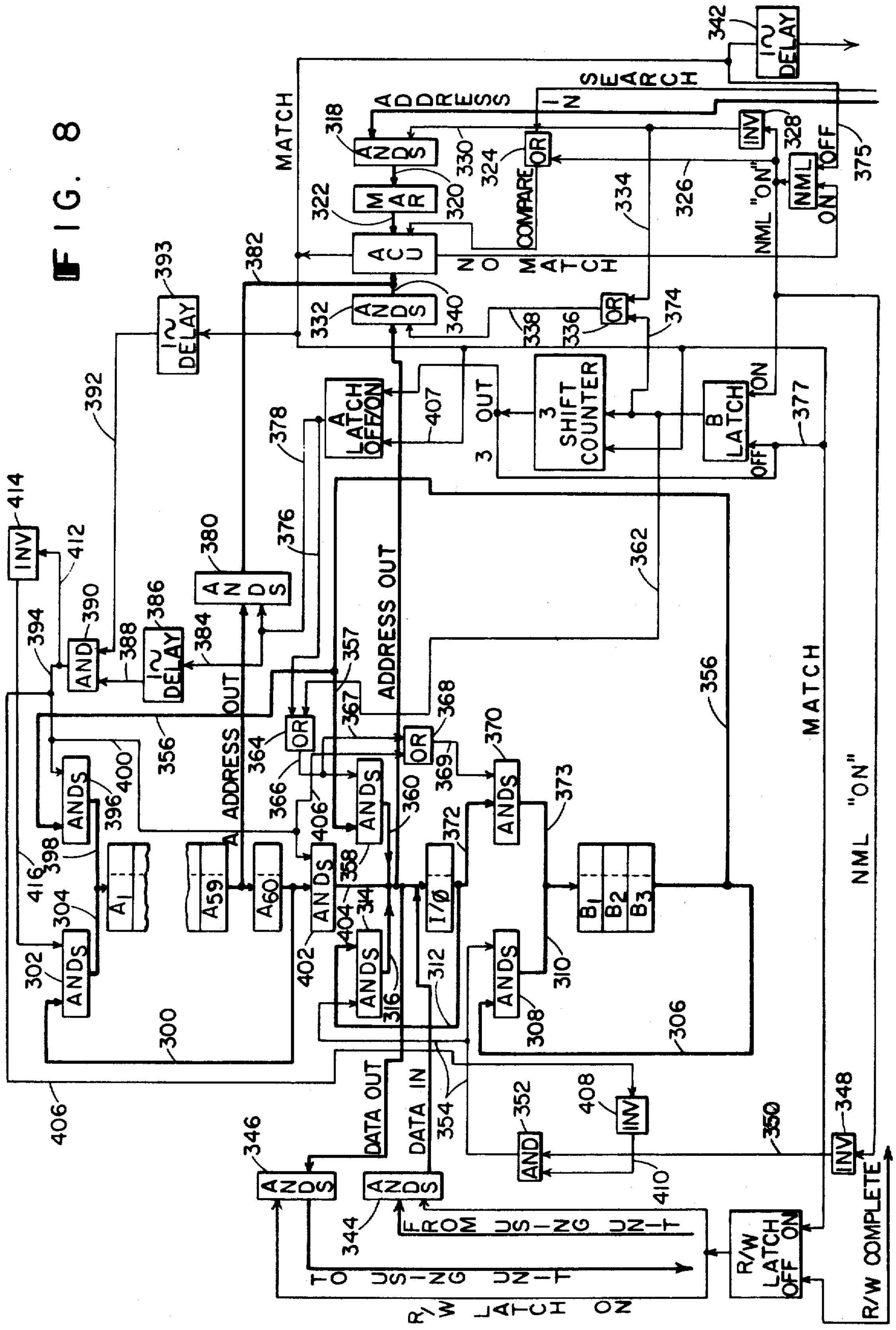
FIG. 8 is a block diagram of controls for operating the registers of the class of FIG. 7 and for reordering the pages thereof in accordance with the invention.

Reference will now be had to FIG. 8 which illustrates operating circuitry for a class of one-way dynamic shift registers organized and shifted as shown in FIG. 7 and previously described herein. In this Figure, the register positions are indicated by rectangles designated as in FIG. 7, only positions $A_1$, $A_{59}$ and $A_{60}$ of the A group being shown. An extra wide and heavy line is used to designate lines in multiple, which, in the case of the shift loops, will be equal in number to the number of registers involved and in the data and address input and output lines will be the number of data and address bits respectively. The plural AND gates involved are designated by rectangles labeled ANDs.

The one-way dynamic shift registers used may be of any type. For example, they may be only the shift-right circuitry of FIG. 3 (14, T-1, 16, S-1, 18, T-2, 20, $S_2$) operated by a two phase pulse train alternately pulsing switches S-1 and S-2. Read-out in FIG. 8 is taken directly from the shift lines as pages are shifted into the position to which the read is applicable. Data is read into the input lines of the I/O position while it is shifting on itself and input circuitry according to FIG. 3 can be utilized while inhibiting the AND circuits through which the shift takes place. Since shift pulses are applied uniformly and unidirectionally, no pulse control circuitry as in FIG. 4 is required. Variations in shift loops are controlled through ANDs as will appear. The shift direction into and out of registers is down in FIG. 8.

When the circuitry of FIG. 8 is not in the search condition, the two register groups $A_1$–$A_{60}$ and $B_1$–$B_3$ and the Input-Output position labeled I/O are operating in the shift loops designated 1 or 1 or 2 in FIG. 7. In the case of the A group, this loop is shift lines 300 connected to the output terminals of all register bits in position $A_{60}$ and through ANDs 302 to lines 304 connected to the input terminals of the bits in position $A_1$. In the case of the B group, the loop is shift lines 306 connected to the output terminals of all register bits in position $B_3$ and, through ANDs 308, to lines 310 connected to the input terminals of the bits in position $B_1$. In the case of I/O, the loop is lines 312 connected to the output terminals of each of its bits and, through ANDs 314, to lines 316 connected to its corresponding inputs. ANDs 302, 308 and 314 are conditioned by circuitry hereinafter described.

Figure 5A:
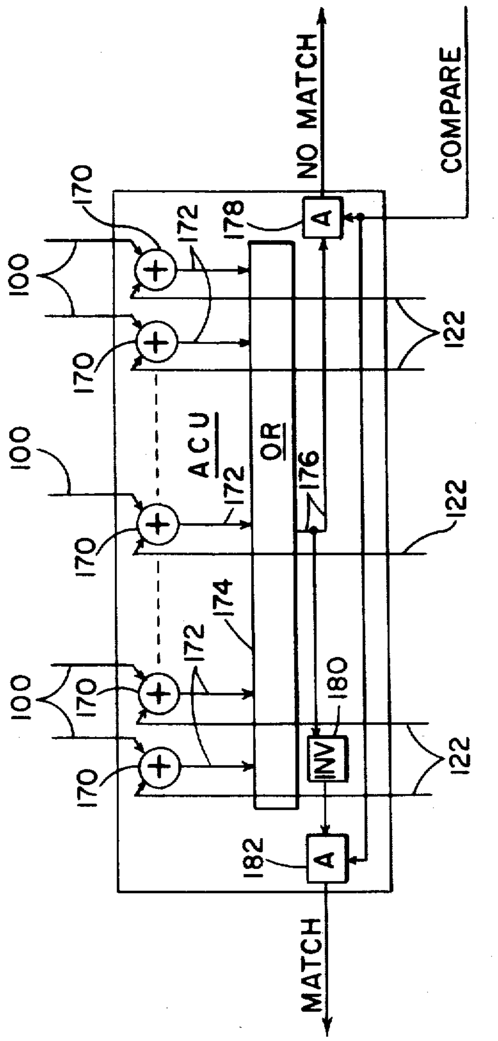
FIG. 5*a* diagrams comparison circuitry which may be used in the Address Comparison Unit of FIG. 5.

When the using unit requests access, by circuitry like that of FIG. 5, it sends the desired address over lines labeled ADDRESS IN through ANDs 318 and lines 320 to a Memory Address Register MAR which in turn conditions the corresponding terminals of an Address Comparison Unit ACU over lines 322. The using unit also conditions a line labeled SEARCH which, through OR circuit 324 and a line labeled COMPARE activates the ALU. As in FIG. 5, the ACU, which may be according to FIG. 5a, is adapted to provide an output to a line labeled MATCH if the comparison is successful and to provide an output on a line labeled NO MATCH if the comparison is not successful. Also as in FIG. 5 an output on the NO MATCH line turns on a No Match Latch NML, the output from which is applied to a line labeled NML "ON"; the NML "ON" line output locks the ACU in compare condition via line 326 to OR gate 324 and the COMPARE LINE, and deconditions ANDs 318 through inverter 328 and line 330 which has previously conditioned these ANDs to pass the requested address, since the NML latch was off. In the FIG. 8 embodiment, the address of the page in the I/O position is applied from the I/O address input lines over lines labeled ADDRESS OUT to ANDs 332. At the time of a request, ANDs 332 are conditioned from the NO MATCH line in off state by inverter 328, line 334 connected to line 330 and through OR circuit 336 and lines 338 to the other terminals of the ANDs 332, so that the bit values on the ADDRESS OUT line are applied to the corresponding terminals of the ACU on lines 340.

If there is a match on the first comparison, the ACU applies an output to the MATCH line which signals the using unit, in this case however through a one shift delay 342. The output on the MATCH line also turns on a Read/Write Latch designated R/W Latch in FIG. 8, the output of which is applied to a line labeled R/W LATCH "ON" which conditions one terminal of ANDs 344 to transmit write data from the using unit via lines labeled FROM USING UNIT to the input lines of the I/O position via lines marked DATA IN, and also to condition ANDs 346 for read-out of the I/O position data via lines labeled DATA OUT connected to the I/O input lines, and lines labeled TO USING UNIT. The R/W LATCH is turned off from the using unit via a line labeled R/W COMPLETE. The positions of the B group and the I/O position continue shifting in the loops represented by lines 306 and 312 respectively, since the respective ANDs 308 and 314 thereof are conditioned from the inactive NO MATCH "ON" line via inverter 348, line 350, AND gate 352 (the other terminal of which is conditioned under the assumed conditions), and line 354. The A group also continues shifting on itself since its ANDs remain conditioned under the assumed circumstances as will hereinafter appear.

If there is not a match on the first comparison, the resultant output from the NML latch to the line NML "ON", in addition to the effects previously mentioned, deconditions ANDs 308 and 314 via inverter 348 and turns on a latch labeled B LATCH. The output from the B LATCH changes the shift loops of the B position group and the I/O position to loop 2 of FIG. 7 in which they are shifted as a unit, this loop being constituted of lines 356 connected to the output terminals of position $B_3$ and input lines 357 therefrom to ANDs 358 the outputs of which via lines 360 are connected to the corresponding inputs to the I/O position. ANDs 358 are conditioned from the LATCH B output line via line 362, OR gate 364 and line 366. The output on line 366 also conditions, via line 367, OR gate 368 and line 369 ANDs 370 which are connected via lines 372 to the corresponding output terminals of the I/O position and via lines 373 to the corresponding input terminals of the $B_1$ position.

The output from the B LATCH is also applied to a shift counter which counts shifts equal in number to the number of positions in group B and is therefore in FIG. 8 labeled 3 SHIFT COUNTER, which has an output to a line labeled 3-OUT when three shifts have occurred. The 3 SHIFT COUNTER may be a three cell, one-way shift dynamic shift register like those used for the data and address bits of the class, the B LATCH output turning the counter on by correcting it into the shift circuit and applying a positive or 1 potential to the first cell, which is shifted out to the 3-OUT line on completion of of the count. The B LATCH output also continues the conditioning of ANDs 332 to apply addresses from the ADDRESS OUT lines to the ACU, via line 374 to OR circuit 336.

IF a match occurs while the B LATCH is on the resultant output on the MATCH line turns the B LATCH off via line 377 to its OFF terminal, which deconditions ANDs 358 and 370 (the other input to OR gate 364 being the off) and terminates shifting in the combined I/O and B loop 2 of FIG. 7. With the B LATCH off, independent shifting of group B and I/O in loops 1 of FIG. 7 is resumed since the output to the MATCH line turns off the NML latch via line 375 to its OFF terminal and conditioning of ANDs 308 and 314 is resumed due to the inversion by inverter 348 of the zero on the NML "ON" line. The resultant signal to the MATCH line signals the using unit and sets the R/W LATCH on as previously explained. Turning the B LATCH off resets the 3 SHIFT COUNTER to 0 by disconnecting it from the shift circuit. Shifting of the A group positions in loop 1 or 2 of FIG. 7 continues by reason of continued conditioning of ANDs 302 by circuitry hereinafter described.

If no match occurs while the B LATCH is on, the output from the 3 SHIFT COUNTER to the line 3-OUT turns off the B LATCH, to the OFF terminal of which it is connected, and turns on another latch, designated A LATCH in FIG. 8, to the ON terminal whereof it is connected. Turning the B LATCH off deconditions the input to OR gate 364 via line 362 but the output from the A LATCH provides another via line 376 so the I/O and B positions continue to shift in the same single loop which includes lines 356 and 357. The A positions continue to shift in a separate loop as before.

The output line of the A LATCH is also connected via line 378 to one of the terminals of ANDs 380 the other terminals of which are connected to the lines labeled A ADDRESS OUT, which are connected to the address bit shift lines from position $A_{59}$ to position $A_{60}$ of the A group and correspond to the line labeled A-OUT in FIG. 7. Turning off the B LATCH deconditioned the input line 374 to OR gate 336 and, since the other input line 334 thereto is also deconditioned from the NML "ON" line via inverter 328, ANDs 332 are now deconditioned. Thus address bits are no longer supplied to the ACU from the I/O position via the ADDRESS OUT lines. However, conditioning of ANDs 380 supplies the ACU instead with address bits via lines 382 therefrom to the corresponding terminals of the ACU. Therefore the addresses of the A position group are compared in the ACU with the requested address in MAR as they are shifted successively from position A59 to position A60.

The A LATCH from its output line via line 384, one shift delay 386 and line 388, conditions one terminal of AND gate 390, the other terminal of which is conditioned by an output from the ACU to the MATCH line via line 392 which includes one shift delay 393. When conditioned, gate 390 conditions, via line 394, one terminal of ANDs 396, the other terminals of which are connected to corresponding bit output lines 356 from position $B_3$. ANDs 396, when conditioned, apply the bit values from lines 356 to the inputs to the corresponding bits of the $A_1$ position of the A group via lines 398. AND gate 390 also conditions, via line 400 connected to line 394, one of the terminals of ANDs 402, the other terminals of which are connected to the shift output lines from position $A_{60}$. ANDs 402, when conditioned, apply the bit values from position $A_{60}$ outputs to the corresponding inputs of the I/O position via lines 404. Line 400 also conditions ANDs 370 via line 406 to the second input of OR gate 368.

When a match occurs on a comparison with an address from the lines A ADDRESS OUT, the resultant output to the MATCH line turns LATCH A off via line 407 to its OFF terminal. This deconditions ANDs 380 preventing any further ACU comparisons with addresses from the A ADDRESS OUT lines. However, the output to the MATCH line also turns off the NML latch via line 375 which, via inverter 328 reconditions ANDs 332 so that an address comparison will be made with the address on the ADDRESS OUT lines on the next shift. The output to the MATCH line also turns on the R/W LATCH and signals the computer unit through delay 342.

On the next shift, AND gate 390 is conditioned by the delayed outputs from delays 386 and 393 with the result that shifting takes place for one shift in loop 3 of FIG. 7, wherein group A, I/O and group B are shifted as a unit, so that $A_{60}$ is shifted into I/O, I/O is shifted into $B_1$, and $B_3$ is shifted into $A_1$. In FIG. 8, this shift loop is represented by lines 356 from the output of $B_3$, ANDs 396 and lines 398 connecting $B_3$ to shift into A1; ANDs 402 and lines 404 connecting $A_{60}$ to shift into I/O; and ANDs 370 and lines 372, 373 connecting I/O to shift into $B_1$, these ANDs being conditioned from gate 390 by lines 394, 400 and 406 respectively.

Since the B LATCH was off and the A LATCH has been turned off by the MATCH, ANDs 358 are deconditioned. Although one terminal of AND gate 352 is conditioned via inverter 348 and line 350 by the turning off of the NML latch and the resultant zero output to the NML "ON" line, the other terminal of gate 352 is deconditioned since it is conditioned by the invert of the output from AND gate 390 via line 406 connected to line 394, inverter 408 and line 410 therefrom to said other terminal of AND gate 352. The remaining ANDs 302 are also deconditioned for this one shift since they are conditioned by the inverted output from AND gate 390, via line 412 connected to line 394, inverter 414 and line 416 connected to the conditioning terminals of ANDs 302.

After completion of the single shift just described, the absence of further output from Delay 386, since the A LATCH is turned off, deconditions AND gate 390 and the ANDs conditioned thereby and ANDs 302, 308 and 314 are conditioned by the circuitry previously explained, so that normal shifting in loops 1 or 1 or 2 or FIG. 7 is resumed.

In order to insure proper operation of the circuitry which they control, Delays 386 and 393 should be of the storage type which deliver an output for a full shift cycle after the one shift cycle delay. Delay circuitry filling these requirements is commercially available but also may be provided as one or more cells of a shift register of the same construction as that of the registers of the class. In such case, the input to the delay shift register sets it at 1 which is read out after one shift cycle to provide the required output. For example, if two phase shift registers using the switches S-1 and S-2 with associated one-way shift circuitry of FIG. 3 are used as the class registers, the delay in question may be of two cells, the input to the first of which is supplied with 1 inputs while its activating source is on and with 0 inputs while that source is off, such input being read out from the second cell as it is switched by switch S-1 and again as it is switched by switch S-2.

As previously mentioned, data may be read into the I/O input lines by circuitry similar to the input circuitry of FIG. 3 while inhibiting ANDs 314 in the data lines so that the new data replaces that which would otherwise have been recirculated into I/O via these lines. Such inhibit circuitry (not shown) may be separate lines 354 conditioning the data and address bit ANDs, the data ANDs conditioning line going by way of an AND gate, the other terminal of which is conditioned by a write signal from the using unit through an inverter. Since read-out from the DATA OUT lines requires a shift for each read, it may be desirable to read the DATA OUT bits to a latch turned on by a MATCH signal, from which they are read via ANDs 346.

As mentioned earlier herein it may be desirable to employ a second Address Comparison Unit ACU which simultaneously compares the addresses from A ADDRESS OUT while the ACU of FIG. 8 is comparing the addresses from I/O, as may readily be done by a few changes in the control circuitry to enable simultaneous operation of the two ACU units so that a match with an address from the ADDRESS OUT lines and a match from the A ADDRESS OUT lines have the same consequences as in FIG. 8.

Control circuitry for the one-way static shift register embodiment of FIG. 9 is not shown since this may be closely similar to that of FIG. 8, particularly if a single ACU unit is employed. In this embodiment, it is desirable to provide one additional shift in the combined IN-OUT-B', shift group (lines 356, 357 and associated ANDs in FIG. 8) if the requested address is not located there, so that the most recently accessed position will be returned to the IN-OUT position and will not be shifted into $A_1$ by the loop 2 shift of FIG. 9 produced by a match from A'-OUT (A ADDRESS OUT in FIG. 8).

The number of positions in the A and B or A' and B' groups of FIGS. 7 to 9 may be varied as desired, the only change in control circuitry required being to change the 3 SHIFT COUNTER of FIG. 8 to conform to a different number of positions in the B or B' group.

In the FIG. 8 embodiment, the one shift delay of the signal to the using unit on the MATCH line is not needed if the requested address is in the I/O or B positions. It is provided to insure that when the requested address is in one of the A positions, the using unit does not read or write until the requested page has been shifted from the A group into the I/O position.

We claim:

1. A storage unit for signals representative of pages of data and their addresses which comprises:

plural shift registers for storing said signals in a like plurality of related positions, the related positions containing signals representative of the data bits and address bits constituting a page, there being an access position wherein the data bits of the page are accessible to a using unit;

shift means interconnecting said positions of said shift registers for shifting said pages from position to position in at least one shift loop which includes said access position and at least one other shift loop which excludes said access position;

address signalling means for providing signals representative of the address bits of a page requested by a using unit;

detector means responsive to said address signalling means and said address bits in said plural shift registers for determining the presence in the access position of a requested page;

means for enabling access to the data bits of a requested page while in said access position; and control means connected to said shift means and said detector means for controlling the shifting of said pages in said respective one or the other shift loops so that pages most recently shifted to said access position are maintained in positions for subsequent successive shifting into said access position on a priority basis to other pages when the requested page is not initially in that position.

2. A storage unit according to claim 1 wherein said control means is arranged to terminate shifting in a loop including said access position when the requested page is shifted into that position.

3. A storage unit according to claim 1 wherein said detector means comprises an address comparison unit.

4. A storage unit according to claim 2 wherein said shift means includes means to control said shift registers to shift a group of said pages in opposite directions, and said control means causes the shifting of said shift registers in a first direction in a shift loop including said access position when the requested page is not initially in that position until the requested page is shifted into that position as determined by said detector means and thereupon causes the shift registers to shift in the second, opposite direction in a loop excluding said access position until the page initially in said access position is located in the position first shifted into said access position on the shift of said pages in said first direction, and thereupon to terminate shifting in said second direction, so that the pages eventually become oriented in the direction of shift into said access position in accordance with recency of requested access thereto.

5. A storage unit according to claim 4 wherein said pages includes all the pages of the storage unit.

6. A storage unit according to claim 4 wherein said shift registers are of the static type.

7. A storage unit according to claim 1 wherein:

said shift means includes means interconnecting said positions of said shift registers to shift a first group of said pages in a first loop which includes said access position, to shift a different, second group of said pages in a second loop which excludes said access position, and to shift both of said groups of pages simultaneously in a third loop which includes said access position;

additional detector means connected to said address signalling means and said address bits in said shift registers for detecting the presence of the requested page in a position of said second loop from which it may be shifted into said access position when said page loops are shifted in said third loop, and to provide a match signal indicative thereof; and said control means includes means responsive to said match signal to cause termination of shifting in said second loop and to cause shifting in said third loop to shift the requested page into said access position, to shift the page previously in said access position into a page position of said first group, and to shift a page of said first group into a page position of said second loop to replace said page shifted into said access position.

8. A storage unit according to claim 7 wherein said control means includes means connected to said detector means arranged to terminate shifting in either of said first and third loops when the requested page is shifted into said access position from a page position of the corresponding loop.

9. A storage unit according to claim 8 wherein said control means includes means connected to said shift means to cause simultaneous shifting in said first and second loops.

10. A storage unit according to claim 7 wherein said shift means includes means interconnecting said positions of said shift registers to shift the pages of said first group other than the page in said access position in a fourth loop excluding said access position, and said control means includes means connected to said shift means to couple said fourth loop to said access position to form said first loop.

11. A storage unit according to claim 7 wherein said positions of said shift registers are interconnected to shift unidirectionally.

* * * * *